United States Patent [19]

Ogawa

[11] Patent Number: 5,341,190
[45] Date of Patent: Aug. 23, 1994

[54] ZOOM LENS CAMERA

[75] Inventor: Kimiaki Ogawa, Tokyo, Japan

[73] Assignee: Asahi Kogaku Kogyo Kabushiki Kaisha, Tokyo, Japan

[21] Appl. No.: 101,788

[22] Filed: Aug. 4, 1993

Related U.S. Application Data

[63] Continuation of Ser. No. 802,717, Dec. 6, 1991, abandoned, which is a continuation of Ser. No. 533,778, Jun. 6, 1990, abandoned.

[30] Foreign Application Priority Data

Jun. 9, 1989 [JP] Japan .................................. 1-148104

[51] Int. Cl.⁵ ...................... G03B 5/00; G03B 7/095; H04N 5/238
[52] U.S. Cl. ............................ 354/446; 354/195.1; 354/484; 348/363; 348/221
[58] Field of Search ............. 354/446, 195.1, 195.12, 354/195.11, 271.1, 484, 451, 452, 219, 222, 199; 358/908, 225, 228, 906

[56] References Cited

U.S. PATENT DOCUMENTS

| | | | |
|---|---|---|---|
| 4,329,029 | 5/1982 | Haskell | 354/289.1 X |
| 4,389,098 | 6/1983 | Fukushima | 350/429 |
| 4,415,248 | 11/1983 | Suzuki et al. | 354/227 |
| 4,442,462 | 4/1984 | Kimura | 358/906 |
| 4,446,526 | 5/1984 | Iwanade | 358/225 X |
| 4,734,730 | 3/1988 | Ootsuka et al. | 354/446 |
| 4,860,113 | 8/1989 | Miyamoto et al. | 358/225 |
| 4,868,592 | 9/1989 | Suzuki et al. | 354/400 |
| 4,870,439 | 9/1989 | Tsuboi et al. | 354/195.12 |
| 4,935,763 | 6/1990 | Itoh et al. | 354/195.1 |
| 4,936,664 | 6/1990 | Haraguchi et al. | 354/195.1 X |
| 4,944,030 | 7/1990 | Haraguchi et al. | 354/195.12 X |
| 4,951,077 | 8/1990 | Kaneko et al. | 354/410 |
| 4,982,218 | 1/1991 | Tsuboi et al. | 354/400 |
| 5,006,937 | 4/1991 | Nonoshita et al. | 358/455 |

FOREIGN PATENT DOCUMENTS

| | | |
|---|---|---|
| 3134916 | 8/1982 | Fed. Rep. of Germany . |
| 3634148 | 4/1987 | Fed. Rep. of Germany . |
| 3641592 | 6/1987 | Fed. Rep. of Germany . |
| 3706726 | 9/1987 | Fed. Rep. of Germany . |

*Primary Examiner*—W. B. Perkey
*Attorney, Agent, or Firm*—Sandler, Greenblum & Bernstein

[57] ABSTRACT

A zoom lens camera has a zoom switch which is operated to drive a zoom lens. A photometric device measures light from an object to drive an aperture in accordance with the result of the photometry that is conducted by the photometric device. The driving of the zoom lens and the driving of the aperture are controlled so that the driving of the zoom lens is temporarily suspended when an instruction is given to drive the aperture. After the aperture has been driven in accordance with the photometry result, the driving of the zoom lens is resumed.

24 Claims, 3 Drawing Sheets

ZOOM LENS CAMERA

This application is a continuation of application Ser. No. 07/802,717, filed Dec. 6, 1991, now abandoned, which is a continuation of application Ser. No. 07/533,778, filed Jun. 6, 1990, now abandoned.

BACKGROUND OF THE INVENTION

1. Field of the Invention

The present invention relates to a zoom lens camera having a power zoom function.

2. Description of the Related Art

Electronic still cameras (i.e., still video camera), have appeared in recent years, the image of one frame (one or two fields) being recorded on one track of a magnetic disk. Accordingly, the magnetic disk is controlled so that it makes one revolution at the period of one field (1/60 sec. according to NTSC).

Since the magnetic disk, which serves as a recording medium, is rotated at such a high speed, a large number of frames can be shot in quick succession (i.e., continuous shooting mode), such as 1, 2 or 5 frames per second, for a desired period of time.

By combining this continuous shooting mode with zooming, a series of images which are gradually enlarged or reduced can be photographed.

In addition, it is possible to check a change in the image before it is actually photographed, by setting a monitor mode in which the image that is read out from an imaging device is displayed on a monitor.

It is noted that zooming causes the luminance to change in accordance with a change in the angle of view and therefore necessitates changing the aperture.

However conventional electronic still cameras suffer from the problem that when zooming is to be conducted, as described above, the aperture is controlled while the zoom lens is being moved, and consequently associated elements, i.e. the imaging circuit, recording circuit, aperture motor, tracking motor, spindle motor, etc. , are simultaneously activated, resulting in an increase in the peak current consumed.

Accordingly, the load on the power supply circuit increases and the rated capacity thereof must be increased, which results in an increase in the overall size of the camera and an increase in the manufacturing cost.

SUMMARY OF THE INVENTION

In view of these circumstances, it is an object of the present invention to enable zooming without increasing the overall size and cost of the apparatus.

The zoom camera of the present invention comprises: a zoom switch means which is operated to drive a zoom lens; a zoom driving means for driving the zoom lens in response to the operation of the zoom switch means; a photometric means for measuring light from an object; an aperture driving means for driving an aperture in accordance with the result of a photometry that is conducted by the photometric means; and a control means for controlling, when an instruction is given to drive the zoom lens, the zoom driving means and the aperture driving means such that the drive of the zoom temporarily suspended, after the aperture is driven in accordance with the result of the photometry that is conducted by the photometric means, the drive of the zoom lens is resumed.

In the zoom camera having the above-described arrangement, the zoom lens is driven in either a TELE or WIDE direction by the zoom driving means, which comprises, for example, a zoom motor, in response to the operation of the zoom switch means, which comprises, for example, a TELE or WIDE switch.

For example, the drive of the zoom lens is suspended after it has been moved for a predetermined time. While the zoom lens is at rest, the aperture is driven by the aperture driving means, which comprises, for example, an aperture motor, in accordance with the result of the photometry that is conducted by the photometric means. After completion of the drive of the aperture, the zoom lens is moved again for a predetermined time.

Thus, the zoom lens and the aperture are driven alternately but not simultaneously. Accordingly, it is possible to minimize the peak driving current and hence reduce the capacity and configuration of the power supply circuit and lower the manufacturing cost.

BRIEF DESCRIPTION OF THE DRAWINGS

The invention will be described below in detail with reference to the accompanying drawings, in which.

DESCRIPTION OF PREFERRED EMBODIMENTS

Figure 1:
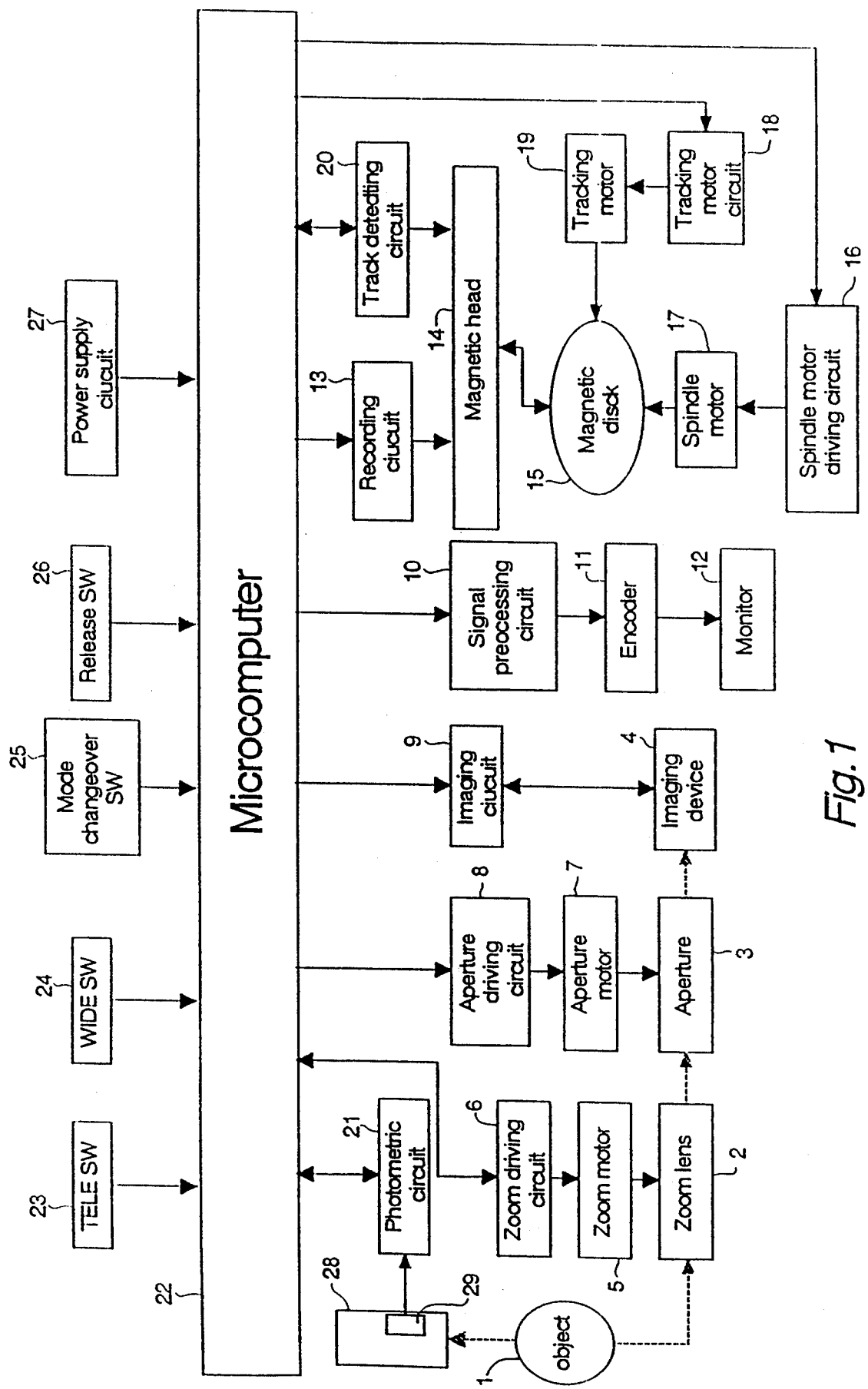
FIG. 1 is a block diagram showing an arrangement of one embodiment in which a zoom camera of the present invention is applied to an electronic still camera.

FIG. 1 is a block diagram showing the arrangement of one embodiment in which a zoom camera of the present invention is applied to an electronic still camera. A zoom lens 2 receiver light from an object 1 and directs it to an imaging device 4 (for example, a CCD) after the light passes through an aperture 3.

The zoom lens 2 is driven by a zoom motor 5, which is driven by a zoom circuit 6. The aperture 3 is driven by an aperture motor 7, which is driven by an aperture driving circuit 8.

An imaging circuit 9 reads out an image signal from the imaging device and delivers its output signal to a signal processing circuit 10. An encoder 11 encodes the output from the signal processing circuit 10 into an NTSC television signal, for example, and supplies it to a monitor 12.

A recording circuit 13 records a signal that is outputted from the signal processing circuit 10 onto a magnetic disk 15 through a magnetic head 14.

A spindle motor driving circuit 16 drives a spindle motor 17 which rotates the magnetic disk 15. A tracking motor driving circuit 18 drives a tracking motor 19 which moves the magnetic head 14.

A track detecting circuit 20 detects a level, such as a DPSK signal, control code signal, etc. from a reproduced signal that is outputted from the magnetic head 14, and outputs the detected information to a microcomputer 22, which serves as a control means.

A photometric circuit 21 measures light from the object I and outputs the result of the photometry to microcomputer 22.

A TELE switch 23 and a WIDE switch 24 are operated to move the zoom lens 2 in a TELE direction and a WIDE direction, respectively. A mode changeover switch 25 is operated to set various photographing modes. A release switch 26 is operated to effect a series of recording operations (e.g., photometry, exposure computation, aperture drive, imaging device exposure, reading, recording, track shift, etc.).

The release switch 26 comprises, for example, a two-stage switch which is arranged such that when the first-stage switch is turned on photometry, distance measurement and exposure computation are executed, and when the second-stage switch is turned on the following image recording operation is initiated.

A power supply circuit 27 has a battery therein to supply necessary electrical power to the circuits, means, etc.

An optical finder 28, which is used to identify the object 1, has a light-receiving element 29 therein for photometry.

Figure 2:
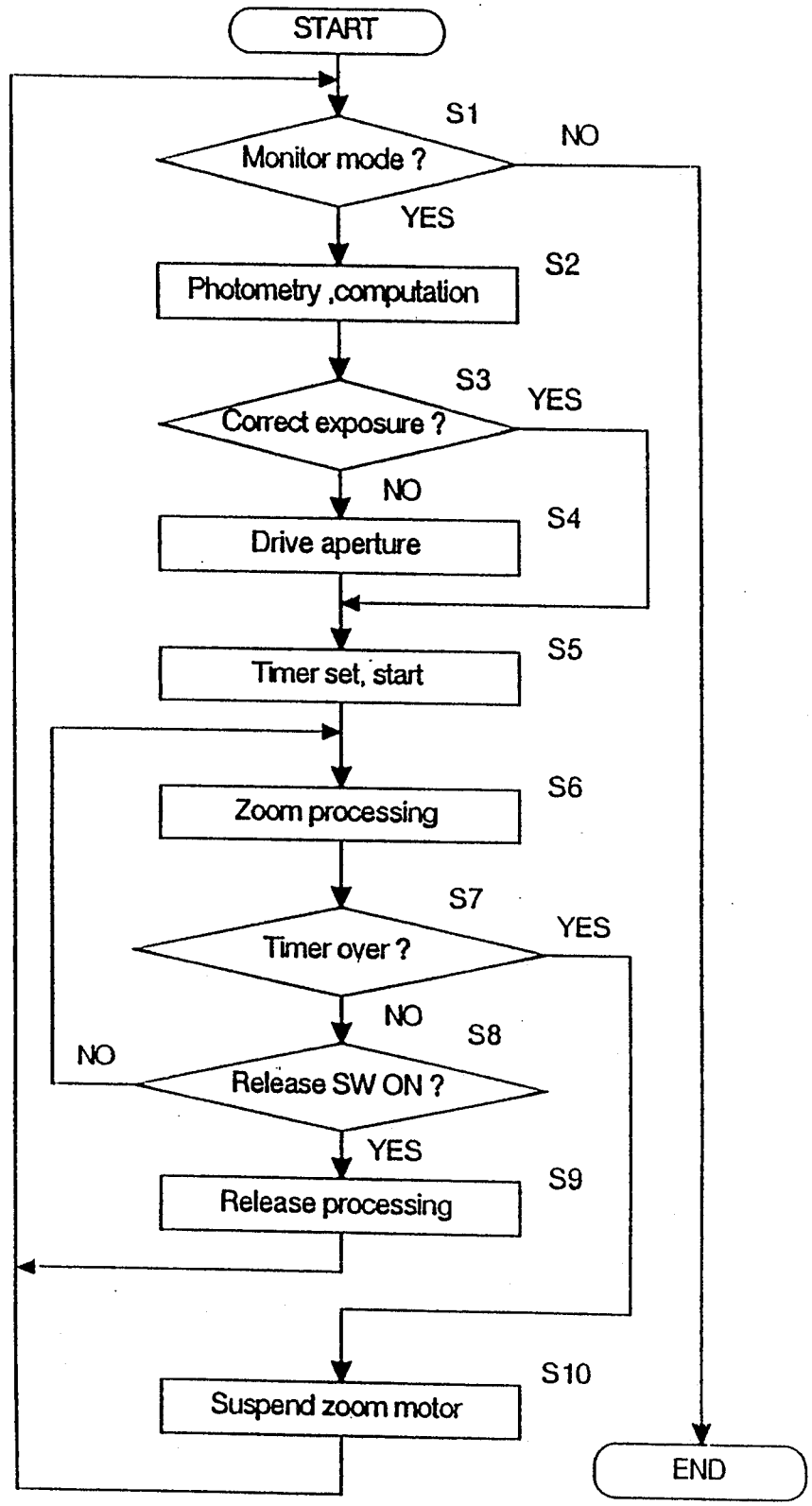
FIG. 2 is a flowchart showing a monitor mode processing used in the embodiment shown in FIG. 1.
Figure 3:
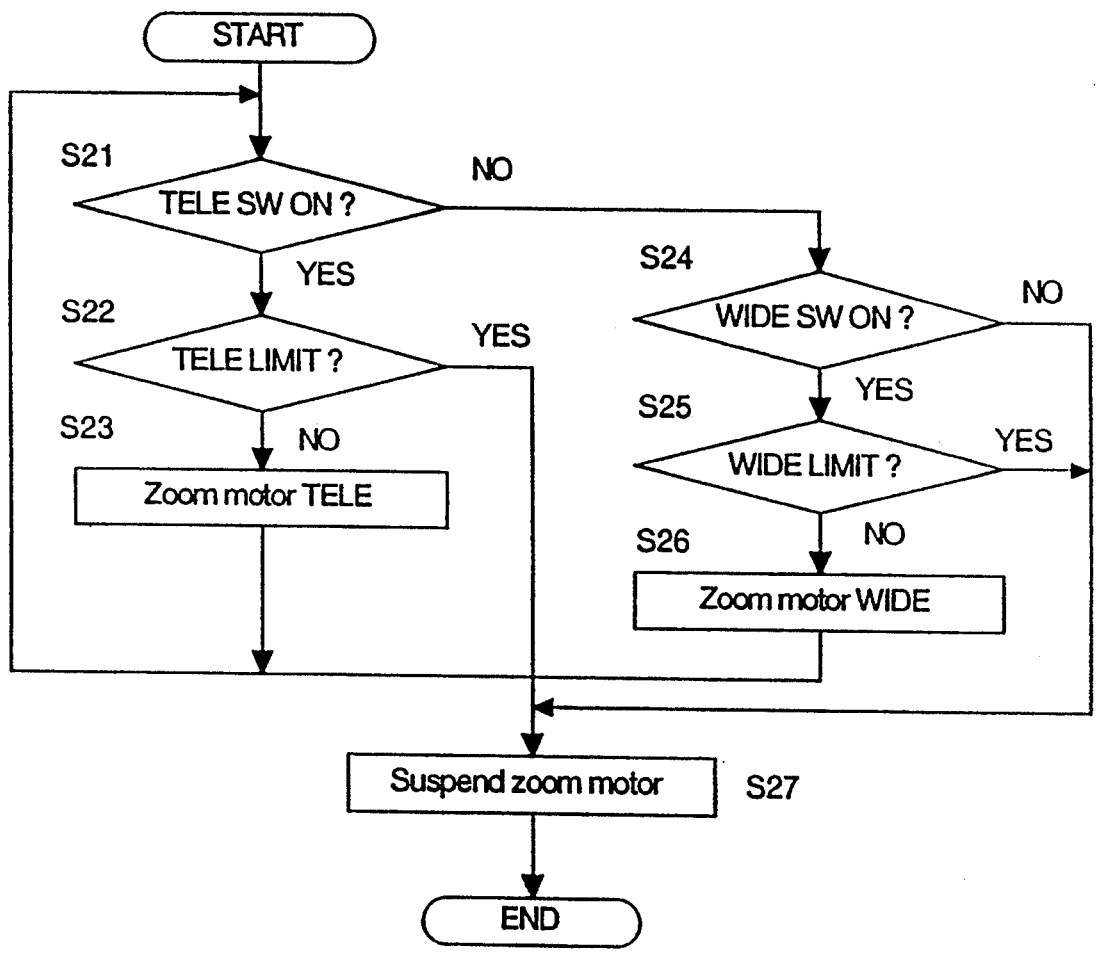
FIG. 3 is a flowchart showing more detailed processing steps in the zoom processing shown in FIG. 2.

The operation will now be explained with reference to the flowcharts shown in FIGS. 2 and 3.

Light from the object 1 enters the imaging device 4 through the zoom lens 2 and aperture 3. A signal that is produced in the imaging device 4 through photoelectric conversion is read out to the imaging circuit 9 and then inputted to the signal processing circuit 10. The signal processing circuit 10 processes the input signal into a signal which is conformable to the format of the electronic still camera.

When the monitor mode is set through the mode changeover switch 25, the signal that is processed in the signal processing circuit 10 is inputted to the encoder 11, in which it is converted into a signal conformable to the NTSC format, for example the converted signal is then outputted to the monitor 12. In this way, object 1 can be monitored through the monitor 12.

When the monitor mode is-.set, as described above, photometric circuit 21 measures the light from the object 1 on the basis of the output from the light receiving element 29 and outputs the result of the photometry to microcomputer 22. The microcomputer 22 computes the signal that is inputted thereto from the photometric circuit 21 to determine a correct exposure quantity (steps S1 and S2).

If the computed exposure quantity is the same as the one which has already been set, the set exposure quantity is left as it is, whereas, if the set exposure quantity is different from the computed value, the aperture driving circuit 8 drives the aperture motor 7 in accordance with the computed exposure quantity (S3 and S4 steps). Thus, aperture 3 is moved to a position where a given exposure is obtained.

Accordingly, display 12 always displays an image with a correct exposure.

Next, the microcomputer 22 starts its built-in timer to execute a zoom processing (steps S5 and S6).

More specifically, if the TELE switch 23 ON and a TELE limit switch (not shown) is OFF microcomputer 22 drives the zoom motor 5 through the zoom driving circuit 6 to move the zoom lens 2 in the TELE direction (steps S22 and S23).

If the TELE switch 23 is OFF, it is determined whether the WIDE switch 24 is ON (S21 and S24). If the WIDE switch 24 is on an and a WIDE limit switch (not shown) is OFF the zoom lens 2 is moved in the WIDE direction (steps S25 and S26).

Whenever the zoom lens 2 is moved, i.e. , in the TELE direction or the WIDE direction, the drive of the zoom motor 5 is suspended when the limit switch concerned turn ON (steps S22, S25 and S27).

This zoom proc until the timer finishes counting a predetermined time, which has been set in advance, or the release switch 26 is turned ON (steps S7 and S8).

After the predetermined time has elapsed, the drive of the zoom motor 5 is suspended, and the processing of step S1 and those following it are repeated (step S10).

If the release switch 26 is turned ON before the predetermined time set on the timer has elapsed, a release processing is executed (steps S8 and S9).

More specifically, a signal that is outputted from the imaging device 4 is inputted to the signal processing circuit 10 through imaging circuit 9. The signal, which is converted into a signal conformable to the format of the electronic still camera in the signal processing circuit 10, is inputted to recording circuit 13, where it is frequency-modulated. The signal is then supplied to magnetic head 14. In the meantime, the microcomputer 22 drives spindle motor 17 through spindle motor driving circuit 16 to rotate magnetic disk 15 at a speed of 3,600 rpm. Accordingly, the image of one frame is recorded on a given track (one field) or two tracks (two fields) of the magnetic disk 15.

Upon completion of this recording, the microcomputer 22 drives the tracking motor 19, through tracking motor driving circuit 18, to move the magnetic head 14 inwardly to the next track on the magnetic disk 15. Then, a signal is reproduced from this track. The reproduced signal is inputted to track detecting circuit 20 from the magnetic head 14. The track detecting circuit 20 detects and outputs a level of the reproduced signal to the microcomputer 22.

The microcomputer 22 determines whether another image signal, that is inputted thereto from the track detecting circuit 20 has already been recorded on the track concerned. If another image signal has already been recorded on the track, the magnetic head 14 is moved to a subsequent vacant track. In this way, it is checked whether or not image data is recordable on a track where the magnetic head 14 is placed.

After the release processing has been executed in this way, the process returns to the processing step S1.

Although the present invention has been described by way of an example in which it is applied to an electronic still camera, it should be noted that the present invention is also applicable to ordinary cameras which are designed to effect photographic recording on film, or video cameras.

As has been described above, the zoom camera of the present invention is arranged such that the movement of the zoom lens and the movement of the aperture are alternately conducted. It is therefore possible to minimize the peak of the power consumption. As a result, the power supply circuit can be reduced in terms of both the capacity and configuration, so that it is possible to reduce the overall size of the apparatus and make the camera compact for the carrying convenience. In addition, the cost is also lowered.

I claim:

1. A zoom lens camera, comprising:
a zoom driving means for driving said zoom lens;
an aperture driving means for driving an aperture; and means for controlling said zoom driving means and said aperture driving means so that, when said zoom lens and said aperture are concurrently instructed to be operated, said aperture is driven by said aperture driving means while movement of said zoom lens is temporarily suspended, said zoom driving means resuming driving said zoom lens for a predetermined amount of time after said aperture is driven, said aperture again being driven, if necessary, by said aperture driving means, after said predetermined amount of time has elapsed.

2. A zoom lens camera according to claim 1, further comprising a zoom switch means which is operated to drive said zoom driving means.

3. A zoom lens camera according to claim 1, further comprising a photometric means for measuring light from an object.

4. A zoom lens camera according to claim 3, wherein said aperture driving means drives said aperture in accordance with a photometry result obtained by said photometric means.

5. A zoom lens camera according to claim 1, further comprising a photometric means for measuring light from an object, whereby said aperture driving means drives said aperture in accordance with a photometry of said photometric means.

6. A zoom lens camera according to claim 1 wherein said camera includes a monitor mode and, further comprising a monitor and means for continuously displaying an image, detected by an electrical imaging device in said camera, on said monitor when in said monitor mode.

7. A zoom lens camera, comprising:
a zoom switch means which is operated to drive a zoom lens;
a zoom driving means for driving said zoom lens in response to the operation of said zoom switch means;
a photometric means for measuring light from an object;
an aperture driving means for driving an aperture in accordance with a photometry result conducted by said photometric means; and
a control means for controlling said zoom driving means and said aperture driving means so that, when said zoom lens and said aperture are concurrently instructed to be operated, said aperture is driven while movement of said zoom lens is temporarily suspended, and after said aperture is driven in accordance with the result of said photometry which is conducted by said photometric means, the driving of said zoom lens is resumed for a predetermined amount of time.

8. A zoom lens camera according to claim 7, wherein said zoom driving means comprises a zoom motor which drives said zoom lens.

9. A zoom lens camera according to claim 7, wherein said zoom switch means comprises at least a teleswitch or a wide switch.

10. A zoom lens camera according to claim 9, wherein, when at least teleswitch or said wide switch is turned ON during a photographing operation, said zoom lens is driven in either a tele direction or a wide direction by a said zoom lens driving means.

11. A zoom lens camera according to claim 7, wherein said aperture driving means comprises an aperture motor which drives said aperture.

12. A zoom lens camera according to claim 7, further comprising a mode changeover switch means which selects a continuous photographing mode.

13. A zoom lens camera according to claim 7, wherein said control means comprises a microcomputer.

14. A zoom lens camera according to claim 7, wherein said camera is a still video camera.

15. A zoom lens camera according to claim 7 wherein said camera includes a monitor mode and, further comprising a motor, and means for continuously displaying an image, detected by an electrical imaging device in said camera on said monitor when in said monitor mode.

16. A zoom lens camera, comprising:
a zoom switch means which is operated to drive a zoom lens;
a zoom driving means for driving said zoom lens in response to the operation of said zoom switch means;
a photometric means for measuring light from an object;
an aperture driving means for driving an aperture in accordance with a photometry result conducted by said photometric means; and
a control means for controlling said zoom driving means and said aperture driving means to that, when said zoom lens is instructed to be operated, said aperture is driven, if necessary, while movement of said zoom lens is temporarily suspended, and after said aperture is driven in accordance with the result of said photometry which is conducted by said photometric means, the driving of said zoom lens is resumed for a predetermined amount of time, whereupon said aperture is again driven by said aperture driving means, if necessary, as a further result of said photometry conducted by said photometric means.

17. A zoom lens camera according to claim 16 wherein said zoom driving means comprises a zoom motor which drives said zoom lens.

18. A zoom lens camera according to claim 16 wherein said zoom switch means to comprises at least a teleswitch or a wide switch.

19. A zoom lens camera according to claim 18 wherein when at least said teleswitch or said wide switch is turned ON during a photographing operation, said zoom lens is driven in either a tele direction or a wide direction by said zoom lens driving means.

20. A zoom lens camera according to claim 16 wherein said aperture driving means comprises an aperture motor which drives said aperture.

21. A zoom lens camera according to claim 16 further comprising a mode changeover switch means which selects a continuous photographing mode.

22. A zoom lens camera according to claim 16, wherein said control means comprises a microcomputer.

23. A zoom lens camera according to claim 16 wherein said camera is a still video camera.

24. A zoom lens camera according to claim 16 wherein said camera includes a monitor mode and, further comprising a monitor, and means for continuously displaying an image, detected by an electrical imaging device in said camera on said monitor when in said monitor mode.

* * * * *

UNITED STATES PATENT AND TRADEMARK OFFICE
CERTIFICATE OF CORRECTION

PATENT NO. : 5,341,190
DATED : August 23, 1994
INVENTOR(S) : Kimiaki Ogawa

It is certified that error appears in the above-indentified patent and that said Letters Patent is hereby corrected as shown below:

At column 6, line 8 (claim 15, line 3), change "motor" to ---monitor---.

At column 6, line 24 (claim 16, line 13), change "to" to ---so---.

Signed and Sealed this

Twenty-first Day of March, 1995

Attest:

BRUCE LEHMAN

Attesting Officer     Commissioner of Patents and Trademarks